No. 720,789. PATENTED FEB. 17, 1903.
J. DELATTRE.
APPARATUS FOR TREATING FISH AND FISH REFUSE.
APPLICATION FILED JUNE 1, 1901.
NO MODEL. 2 SHEETS—SHEET 1.

Fig.1

Witnesses:
Henry Thume
George Barry Jr

Inventor:
Jules Delattre
by attorneys
Brown & Seward

No. 720,789. PATENTED FEB. 17, 1903.
J. DELATTRE.
APPARATUS FOR TREATING FISH AND FISH REFUSE.
APPLICATION FILED JUNE 1, 1901.
NO MODEL. 2 SHEETS—SHEET 2.
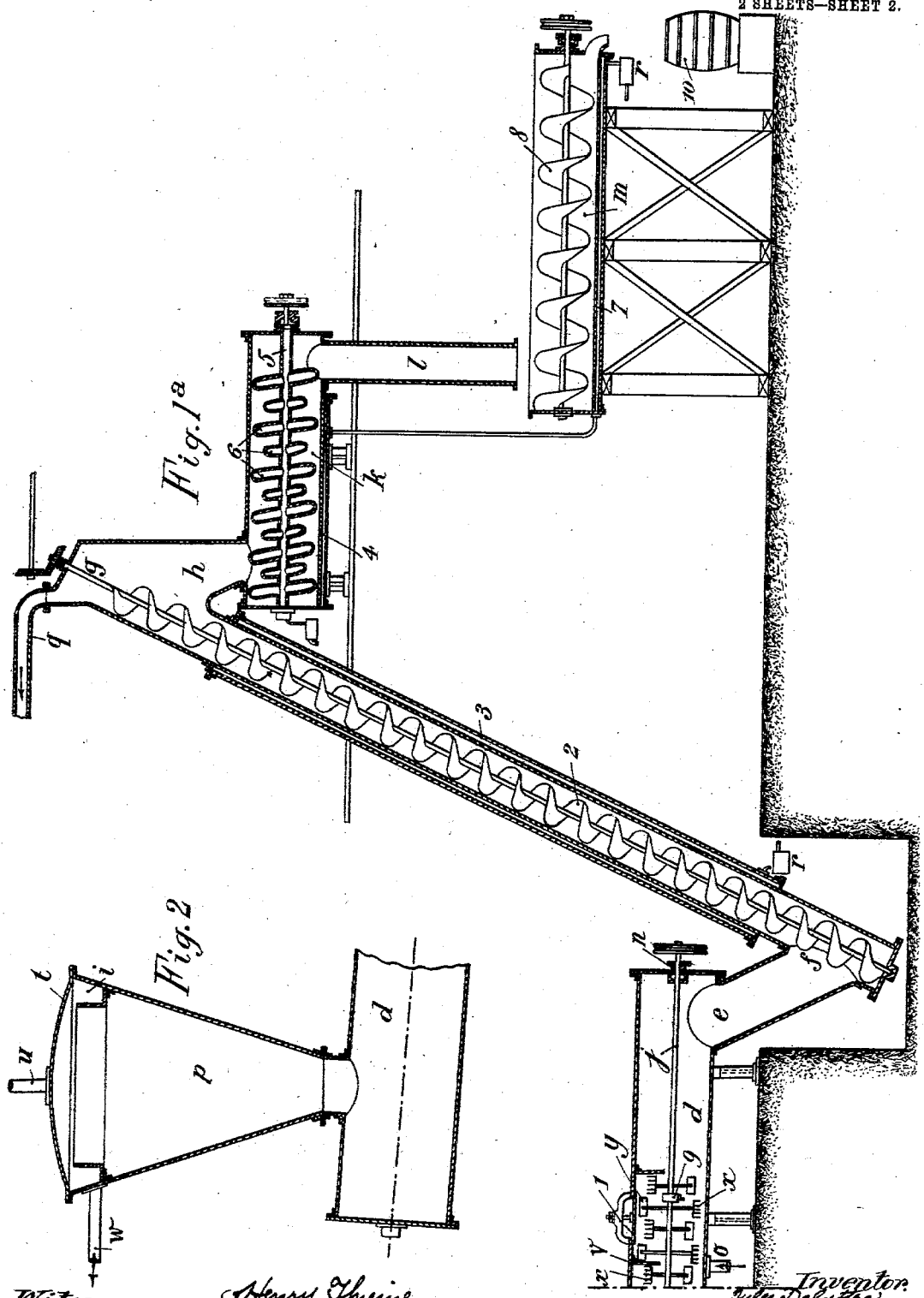

UNITED STATES PATENT OFFICE.

JULES DELATTRE, OF DORIGNIES-FLERS, FRANCE, ASSIGNOR TO SOCIÉTÉ ANONYME D'EPURATION DES EAUX-VANNES ET D'EXTRACTION DES MATIÈRES GRASSES PAR LES PROCÉDÉS DELATTRE, OF ROUBAIX, FRANCE.

APPARATUS FOR TREATING FISH AND FISH REFUSE.

SPECIFICATION forming part of Letters Patent No. 720,789, dated February 17, 1903.

Application filed June 1, 1901. Serial No. 62,693. (No model.)

*To all whom it may concern:*

Be it known that I, JULES DELATTRE, engineer, a citizen of the Republic of France, and a resident of Dorignies-Flers, Nord, France, have invented new and useful Improvements in Apparatus for the Treatment of Fish and Fish Refuse for the Purpose of Transforming Them into Fish-Oil and Fish-Manure, of which the following is a specification.

This invention relates to an apparatus for the treatment of fish and fish refuse, with the object of transforming them into oil and fish-manure, under conditions which are at the same time both economical and hygienic and which leave no residue.

Hitherto the extraction of oil from fish necessitated a preliminary cooking of the raw material. This is a costly operation possessing the disadvantage of giving off infectious vapors and odors and producing a cooking-water the drawing off of which is extremely difficult and attended with the most serious objections.

My apparatus enables me to commercially carry out a new process which entirely does away with the preliminary cooking with all its disadvantages, and which consists, essentially, in mincing or disintegrating the raw fish or the fish refuse, so as to form a kind of pulp, then treating such pulp with a solvent of fatty bodies. This very simple process permits the extraction of practically the whole of the oil, leaving behind as a residue a material which after drying constitutes a pulverized manure of great value. It is equally applicable to fresh fish, to salted or smoked fish, to whole fish, or to refuse, entrails, &c.

As carried out substantially in the manner to be presently described my process may be applied even to the treatment of bad fish—that is to say, more or less decomposed—without any preliminary treatment and without any complication of a commercial or hygienic nature resulting therefrom, the oil becoming purified in a most complete manner in my apparatus and the residues being disinfected by the extracting agent and by the method of extraction, which destroys all germs.

I will now proceed to describe my apparatus by the aid of the accompanying drawings.

Figures 1 and 1$^a$ show in vertical section, respectively, the left-hand part and the right-hand part of the apparatus. Fig. 2 is a vertical section showing a modification of the construction of a portion of the apparatus.

As will be seen from the description, the whole of the work is carried out with the exclusion of air in a closed apparatus and in an automatic manner. The fish just as it arrives at the works, no matter in what condition, is introduced into the apparatus, and the latter produces, on the one hand, a limpid solution of oil in the solvent employed and, on the other hand, the dry and pulverized fish-manure.

The drawings will enable the course of the operation to be readily followed. The raw fish is thrown into the hopper $s$ of a mincer $a$ or other analogous disintegrator, which has the effect of dividing the mass into an almost homogeneous pulp. This pulp flows out into the vertical cylinder $b$, which serves as the feeding apparatus for the oil-extractor $d\,d$. The introduction into the extractor is effected by the pushing action of a helix $z$, which prevents all choking.

The "extracting apparatus" $d\,d$, properly so called, is of an analogous type to that which is described in the specification of my United States Patent No. 671,131; but it includes additions which are of the utmost importance for this special application. In principle it is composed of a slightly-inclined cylindrical tube of great length $d\,d$, closed at its two extremities and traversed at its axis by a shaft $j$, passing to the two ends into the stuffing-boxes $n\,n$ and supported interiorly by the bearings $q$, placed at suitable distances apart. This shaft may be in a single section or length, actuated at one extremity or at both, or it may be divided into lengths, either equal or unequal, actuated separately. It is provided with blades $y$ and rakes or forks $x$, fixed in variable positions around the axis $j$, the blades so as to carry around the material to be treated and mix it intimately with the solvent, the rakes or forks so as to thoroughly divide up the mass and to avoid the formation of lumps or balls, which would not allow the solvent to penetrate. At its highest part the tube $d\,d$ is provided with a column $p$, which may be cylindrical, Fig. 1, or of elliptical form, conical again—that is to say, with a section increasing from bottom to top, as in Fig. 2. This column has for its object to facilitate the decantation of the fatty solution on its delivery from the apparatus. When it is conical, it acts not only by its capacity, but also by the diminution of the speed of the ascension of the liquid from the bottom upward. The column $p$ is closed by a cover $t$, provided with a tube $u$, which serves for the escape of the air and the vapors which may form in the apparatus. With regard to the delivery of the fatty solution this takes place through a lateral tube $w$. I might complete this arrangement by employing an interior annular gutter $i$, which has the effect of compelling the liquid to flow right around the edge of the decanting-column in a regular layer, so as to avoid the formation of a current capable of carrying along solid matters. Throughout its length the tube $d\,d$ is provided with manholes 1, allowing access to the interior and the renewal of the bearings. It may be divided into several sections arranged in a zigzag. At the lower part the tube $d\,d$ is prolonged by an acutely-inclined tube $e$, connected with another cylindrical tube $f\,g$, in which is arranged a worm elevator 2 or other form of conveyer. The tube $f\,g$ may be surrounded by a double envelop to receive steam with the object of heating the rising material, which offers a great advantage for the continuity of the operations, as will be shown later on. The tube $f\,g$ rises at least to a level as elevated as the supply-mincer $a$. It terminates at its upper end in an enlargement, from which descends a chute $h$, and which at its higher part is provided at its upper end with a tube $q$, connected with any form of condensing apparatus. The chute $h$ communicates at its lower end with a cylindrical hermetically-closed drum $k$, which is surrounded either completely or up to the level of its axis only by a double wall 4; in which steam for heating is also caused to pass. This cylindrical drum $k$ is traversed by a shaft 5, which I preferably make hollow and which is provided with hollow helices or hollow blades of helicoidal form 6, having for their object the carrying forward of the material slowly from one extremity to the other. As steam is supplied to the shaft and the blades, the traveling of the material takes place at same time as it is being treated. At the extremity of the drum this material falls through a tube $l$ into a trough $m$, which may be either closed or freely open to the air and which, like the drum $k$, is surrounded by a steam-jacket 7. This trough is provided with a shaft having a helical or other conveyer 8, having for its object to carry the material along while continuing to heat it and divide it up. At the extremity of the trough $m$, the length of which is sufficient for imparting to the material the desired degree of dryness, the dried product falls directly into sacks or barrels 10. Provision may also be made for subsequently pulverizing it; but this is not a necessity when the disintegrating mincer is suitably adjusted.

As I have above stated, the raw fish introduced into the disintegrating-mincer $a$ is transformed into paste or pulp, containing the bones, the fins, the flesh, the entrails, &c. This pulp falls into the feed-column $b$, is pushed by the worm $z$ toward the tube $c$, and enters into the extracting apparatus $d\,d$, which it traverses from the top downward. The solvent—benzin, sulfuret of carbon, or other solvent—is introduced toward the lower end of the tube $d\,d$ at $o$ and traverses this tube from the bottom upward. The blades $y$ and the rakes or forks $x$ keep up a continual agitation and division of the mass, and the circulation in opposite directions of the product to be deprived of its fat and of the solvent has for effect to methodically exhaust from the fish all the oil which it contains. The baffles $v$, placed at suitable distances apart in the upper zone of the tube $d\,d$, prevent the light solvent from rapidly reaching the top of the apparatus, and the blades prevent the separation. The solvent charged with fat gradually attains the upper part of the tube $d\,d$, where no blades are situated. It thus separates itself from the material under treatment and rises up in the drawing-off column $p$, whence it issues by the upper tube $w$ and proceeds to a distillation apparatus of any type, which regenerates the solvent and frees the oil. The latter may then be submitted to ordinary purification; but I prefer to effect the purification of the fatty solution between the extractor and the distiller either by decantation, filtration, or centrifugal separation. Experience has shown me, moreover, that such purification is easily effected, the solution becoming well and rapidly clarified.

It should be pointed out that the extraction process is carried on cold without any other preparation than the reduction of the fish to pulp. Provision might, however, be made for heating, if for certain raw materials or in certain regions it should be found beneficial. This can then be effected either by means of a double envelop or jacket with a circulation of steam or hot water around the tube $d\,d$ or by placing at the lower part of the interior of the tube a steam-coil.

The pulp to be treated descending through the tube $d\,d$ encounters purer and purer benzin or other solvent. It is thus exhausted of its fat and arrives at the lower part of the said tube $d\,d$ entirely deprived of same. It then falls through the tube $e$ into the worm or elevator $f$. The lower part of the tube $d\,d$ not being furnished with blades nor with baffles, there is practically no solvent below the entrance-pipe $c$; but in order to correct any accidental passage of same and, further, to avoid any loss of the solvent the material is heated in the elevator $f\,g$. The vapors disengaged from the solvent escape by the tube $q$ and pass to the condenser. When the heated material from which the fat has been extracted arrives at the top of the elevator $f\,g$, it falls through the pocket or enlargement $h$ into the drying-drum $k$, which it traverses from one end to the other. The last traces of the solvent are carried off with the water-vapor through the tube $q$ to the condenser. Finally from the drying-drum $k$ the material falls into the trough $m$, where the drying is completed. The vapor from the water may without inconvenience be allowed to escape freely into the air, for after the preceding operations it has generally no bad smell. If there is any objection to this, the trough may be connected by a mantle with the chimney-shaft of the works.

It is important to note that the only water to be evaporated is that which the flesh of the fish contained, which represents an infinitely smaller quantity than is the case in processes requiring a preliminary cooking. The entire evaporation, economically effected by the system of double heating envelops or jackets, which may be connected together, so as to effectively utilize the steam, and which are provided with automatic blow-off cocks $r$, avoids all residuary water or effluent. If the heating in the drum $k$ has taken off a certain quantity of water, it is condensed in the condenser with the solvent and it is separated therefrom by the employment of an extractor known as a "Florentine receiver" without any difficulty. The minimum quantity of water deprived of germs by the distillation can cause no inconvenience.

I claim—

1. In an apparatus of the character described, the combination of a mechanical disintegrator for transforming the matter to be treated into pulp, a mixing-extractor in which the pulp and a solvent are caused to circulate in opposite directions, and a closed column containing a rotary helix between the outlet of the disintegrator and the inlet of the extractor for taking the pulp from the disintegrator to the extractor in a continuous manner unexposed to the air, substantially as herein described.

2. In an apparatus of the character described, the combination of a mechanical disintegrator for transforming the matter to be treated into pulp, a mixing-extractor in which the pulp and a solvent are caused to circulate in opposite directions, a connection between the outlet of the disintegrator and the inlet of the extractor through which the pulp passes from said outlet to said inlet in a continuous manner unexposed to the air, a closed elevator having a tubular connection at its lower part with the outlet of the extractor, means for heating said elevator, an escape-tube for vapors at the upper end of said elevator, and a chute for the discharge from the top of the elevator of the matter from which the grease has been extracted, substantially as herein described.

3. In an apparatus of the character described, the combination of a mechanical disintegrator for transforming the matter to be treated into pulp, a mixing-extractor in which the pulp and a solvent are caused to circulate in opposite directions, a closed column containing a rotary helix between the outlet of the disintegrator and the inlet of the extractor for taking the pulp in a continuous manner unexposed to the air from the disintegrator to the extractor, a closed elevator at the outlet of the extractor, means for heating said elevator, an escape-tube for vapors at the upper end of said elevator, and a chute through which the matter from which the grease has been extracted leaves the top of the elevator, all substantially as herein described.

4. The combination, with the disintegrating-mincer and the oil-extracting apparatus, of a mechanical delivery apparatus with a steam-jacket, a drying-drum and a final drier, substantially as herein described.

5. The combination of the mechanical disintegrator, the extractor, the feeding-column and contained rotary helix which connects the disintegrator and extractor, the steam-jacketed mechanical elevator, the evaporating-drum, and the final drier, all essentially as herein described.

In testimony that I claim the foregoing as my invention I have signed my name, in presence of two witnesses, this 17th day of May, 1901.

JULES DELATTRE.

Witnesses:
E. DUFOVERT,
NOEL DHULD.